United States Patent
Ashiya et al.

(10) Patent No.: US 6,671,173 B2
(45) Date of Patent: Dec. 30, 2003

(54) SUBSTRATE-STACKING STRUCTURE

(75) Inventors: Hiroyuki Ashiya, Haibara-gun (JP); Yoshiyuki Tanaka, Haibara-gun (JP); Yayoi Maki, Haibara-gun (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/093,405

(22) Filed: Mar. 11, 2002

(65) Prior Publication Data

US 2002/0131239 A1 Sep. 19, 2002

(30) Foreign Application Priority Data

Mar. 12, 2001 (JP) ..................... P2001-069074

(51) Int. Cl.[7] .............................................. H05K 7/20
(52) U.S. Cl. ..................... 361/704; 165/80.3; 165/185; 361/690; 361/679; 361/715; 361/816; 361/800; 361/801; 361/721; 361/720; 361/819
(58) Field of Search .................. 165/86.3, 185; 361/600, 679, 690, 694–695, 702, 707–711, 715, 719–721, 758, 784, 790–791, 800, 802–804, 807, 809–810, 819, 816, 818, 822–823, 833–834

(56) References Cited

U.S. PATENT DOCUMENTS

| 4,916,575 A | * | 4/1990 | Van Asten | 361/707 |
| 6,101,089 A | * | 8/2000 | Seto et al. | 361/800 |
| 6,151,215 A | * | 11/2000 | Hoffman | 361/704 |
| 6,442,028 B2 | * | 8/2002 | Yamazaki | 361/704 |

FOREIGN PATENT DOCUMENTS

| EP | 0 497 198 A1 | 8/1992 |
| JP | 6-45371 | 6/1994 |

OTHER PUBLICATIONS

Patent Abstract of Japan, vol. 014, No. 437, Sep. 19, 1990 & JP 02 170 598 Abstract.

* cited by examiner

Primary Examiner—Gregory Thompson
(74) Attorney, Agent, or Firm—Sughrue Mion, PLLC

(57) ABSTRACT

In a substrate-stacking structure, a substrate, having heat-generating parts mounted thereon, and a control substrate, having control parts mounted thereon, are held spaced a predetermined distance from each other. The substrate and the control substrate are held spaced the predetermined distance from each other through a holding plate, and a heat shielding plate is interposed between these substrates, and an air layer is formed between the heat shielding plate and the control substrate.

6 Claims, 17 Drawing Sheets

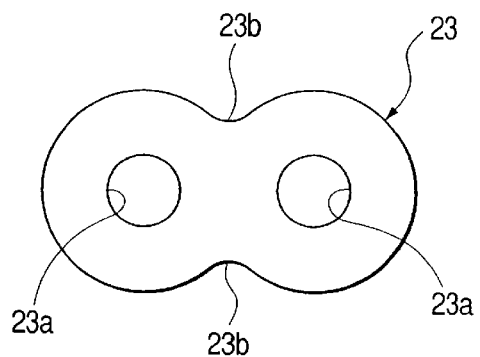
FIG. 14
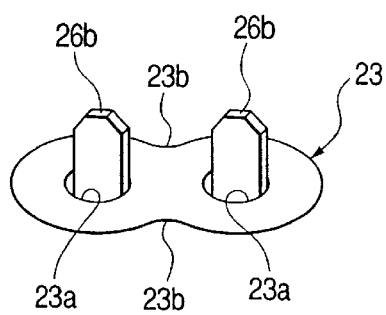
FIG. 15
FIG. 16
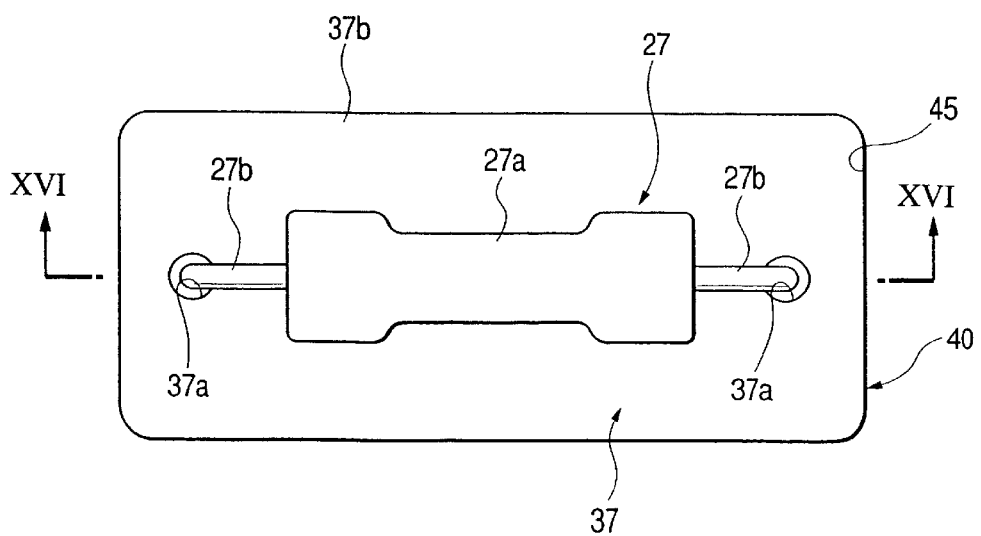

SUBSTRATE-STACKING STRUCTURE

BACKGROUND OF THE INVENTION

1. Field of the Invention

This invention relates to a substrate-stacking structure suited for use, for example, in an electronic control unit (ECU) in which a substrate, having heat-generating parts mounted thereon, and a control substrate, having control parts mounted thereon, are held spaced a predetermined distance from each other.

2. Related Art

One such substrate-stacking structure of this type is disclosed in JP-A-6-45371U, and is shown in FIG. 20. As shown in FIG. 20, this substrate-stacking structure includes a casing 1 having a terminal holder 2 provided at a lower portion thereof. A printed circuit substrate 4, having a relay 3 (which is a heat-generating part for a large electric current) mounted thereon, is provided at that side of the casing 1 where the terminal holder 2 is provided. A control substrate 7, having control parts 5 and 6, such as an IC and a transistor, is provided at an upper portion of the casing 1 in opposed relation to the relay 3. The printed circuit substrate 4 and the control substrate 7 are disposed in stacked, opposed relation to each other within the casing 1, and are spaced a predetermined distance from each other.

In the above conventional substrate-stacking structure, however, the control substrate 7, having the control parts 5 and 6 mounted thereon, is disposed in opposed relation to the relay 3 mounted on the printed circuit substrate 4, and therefore the control parts 5 and 6 and the control substrate 7 have been liable to be influenced by radiation heat from the relay 3 and the printed circuit substrate 4.

SUMMARY OF THE INVENTION

Therefore, this invention has been made in order to solve the above problem, and an object of the invention is to provide a substrate-stacking structure in which the influence of radiation heat, generated from a heat-generating part and a printed circuit substrate, on control parts and a control substrate, can be reduced.

According to the invention, there is provided a substrate-stacking structure comprising: a main substrate as first substrate having a heat-generating part mounted thereon; a control substrate as second substrate having a control part mounted thereon; and a heat shielding plate is interposed between the first and second substrates; wherein the first substrate and the second substrate are held spaced a predetermined distance from each other through a holding plate.

In this substrate-stacking structure, radiation heat from the heat-generating part and the main substrate is intercepted by the heat shielding plate, and therefore the control part and the second substrate will not be influenced by the radiation heat.

The substrate-stacking structure of the invention is further characterized in that the heat shielding plate is formed integrally with the holding plate, and an air layer is formed between the heat shielding plate and the second substrate.

In this substrate-stacking structure, the air layer is positively formed between the heat shielding plate and the control substrate through the holding plate, and the radiation heat from the heat-generating part and the substrate can be efficiently radiated through the heat shielding plate and the air layer.

The substrate-stacking structure of the invention is further characterized in that the holding plate includes a side wall portion from which a hook portion is projected and the heat shielding plate is formed integrally with the holding plate, and wherein the hook portion is engaged in a recess formed on the second substrate, so that the second substrate is positioned in relative to the first substrate.

In this substrate-stacking structure, the second substrate as control substrate is reliably positioned in relative to the first substrate as main substrate.

The substrate-stacking structure of the invention is further characterized in that at least one projection is formed on the heat shielding plate, and the projection abuts with the second substrate, so that the air layer between the heat shielding plate and the control substrate is always kept to a constant value.

In this substrate-stacking structure the air layer between the heat shielding plate and the control substrate is always kept to a constant value through the projections formed on the heat shielding plate.

BRIEF DESCRIPTION OF THE PREFERRED EMBODIMENT

FIG. 14 is a view explanatory of a land portion used in the electronic control unit;

FIG. 15 is a perspective view showing the relation between the land portion and terminals;

FIG. 16 is an enlarged plan view of a portion VII of FIG. 6;

DETAILED DESCRIPTION OF THE PREFERRED EMBODIMENTS

One preferred embodiment of the present invention will now be described with reference to the drawings.

Figure 1:
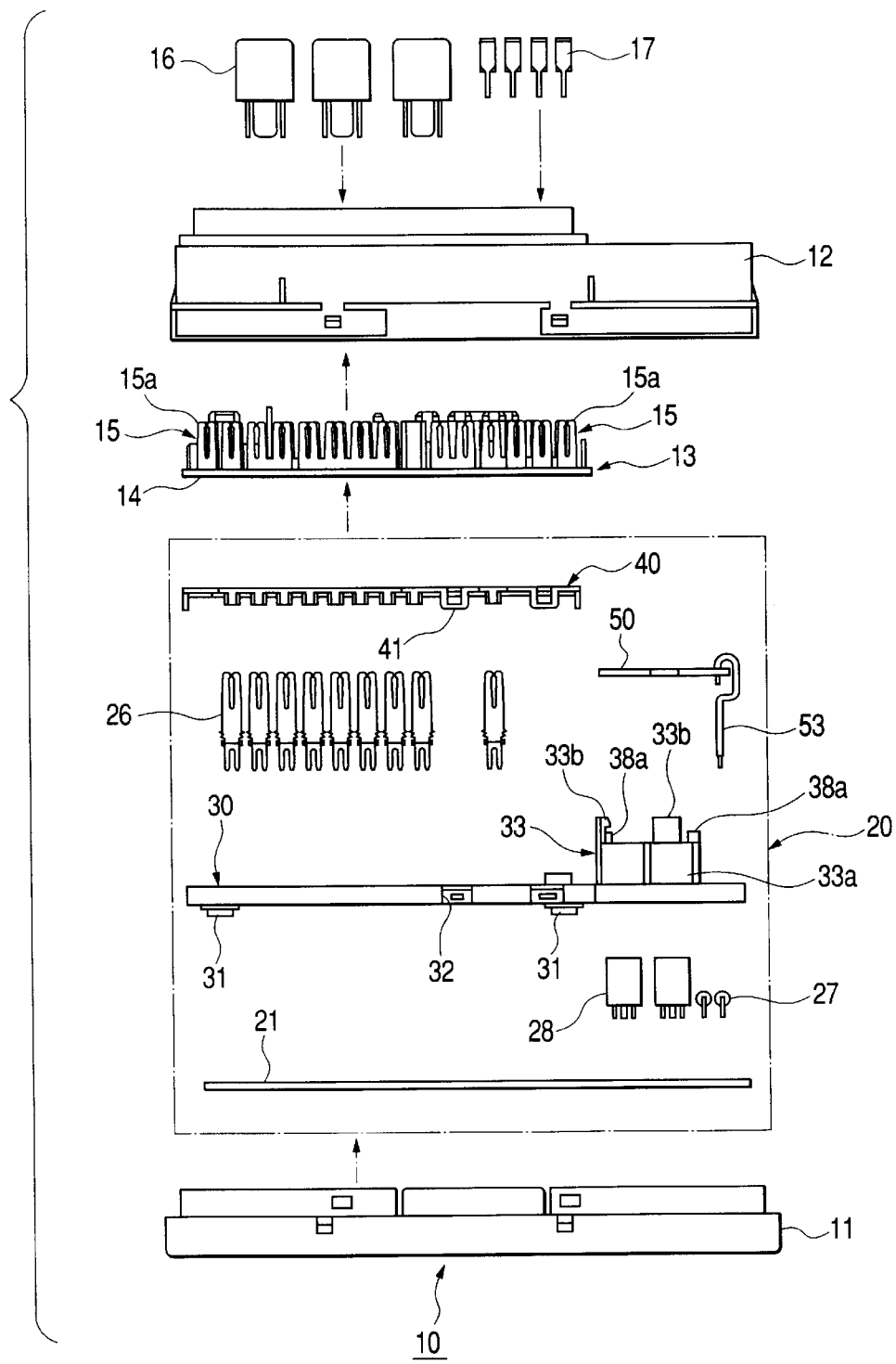
FIG. 1 is an exploded, front-elevational view showing one preferred embodiment of an electronic control unit-integrated electric connection box of the present invention.
Figure 2:
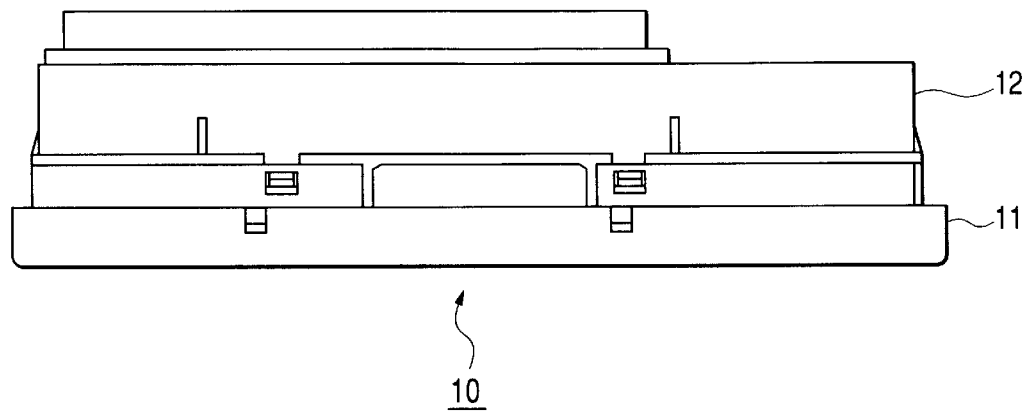
FIG. 2 is a front-elevational view of the electric connection box.
Figure 3:
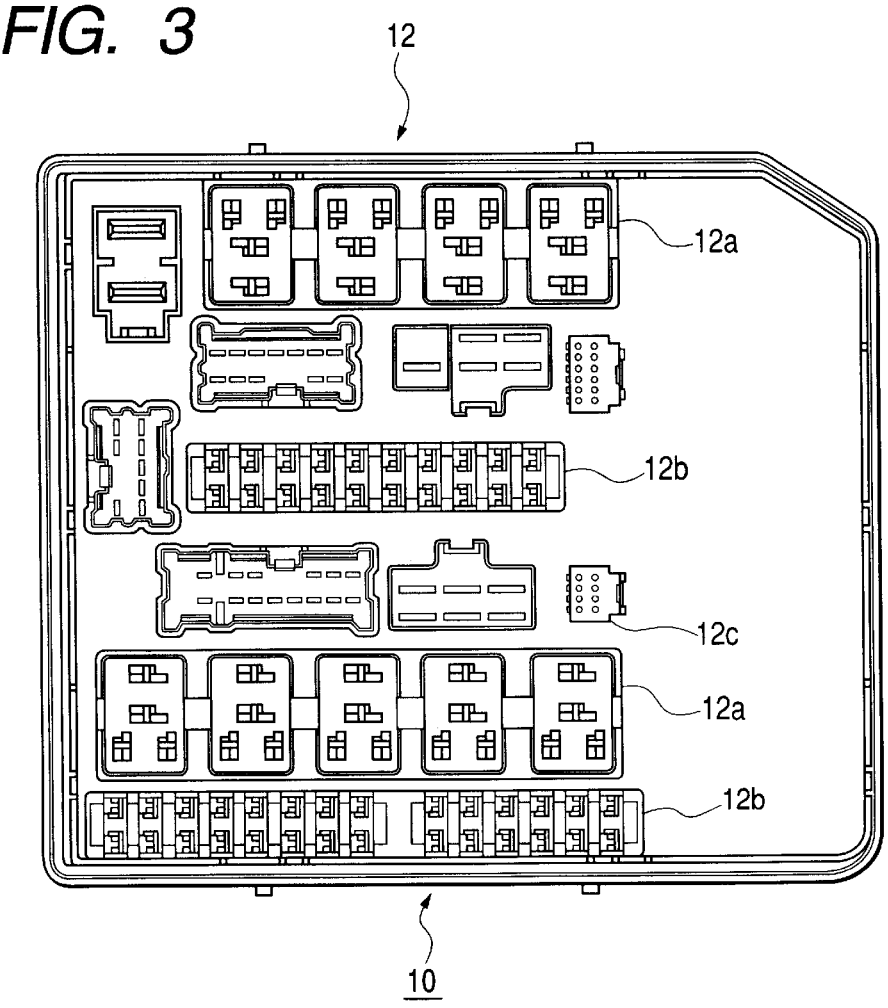
FIG. 3 is a plan view of the electric connection box.
Figure 4:
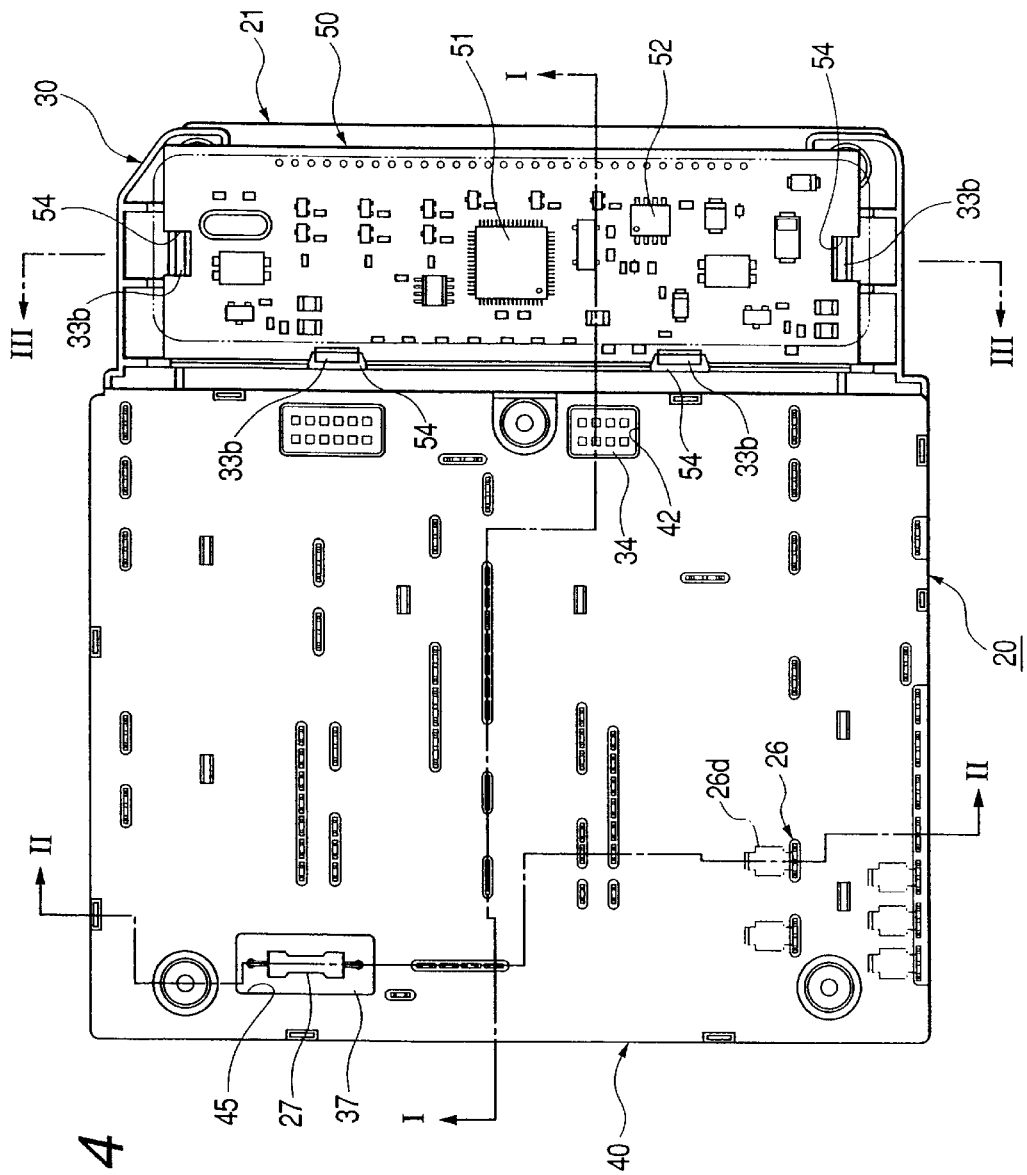
FIG. 4 is a plan view of an electronic control unit integrated in the electric connection box.
Figure 5:
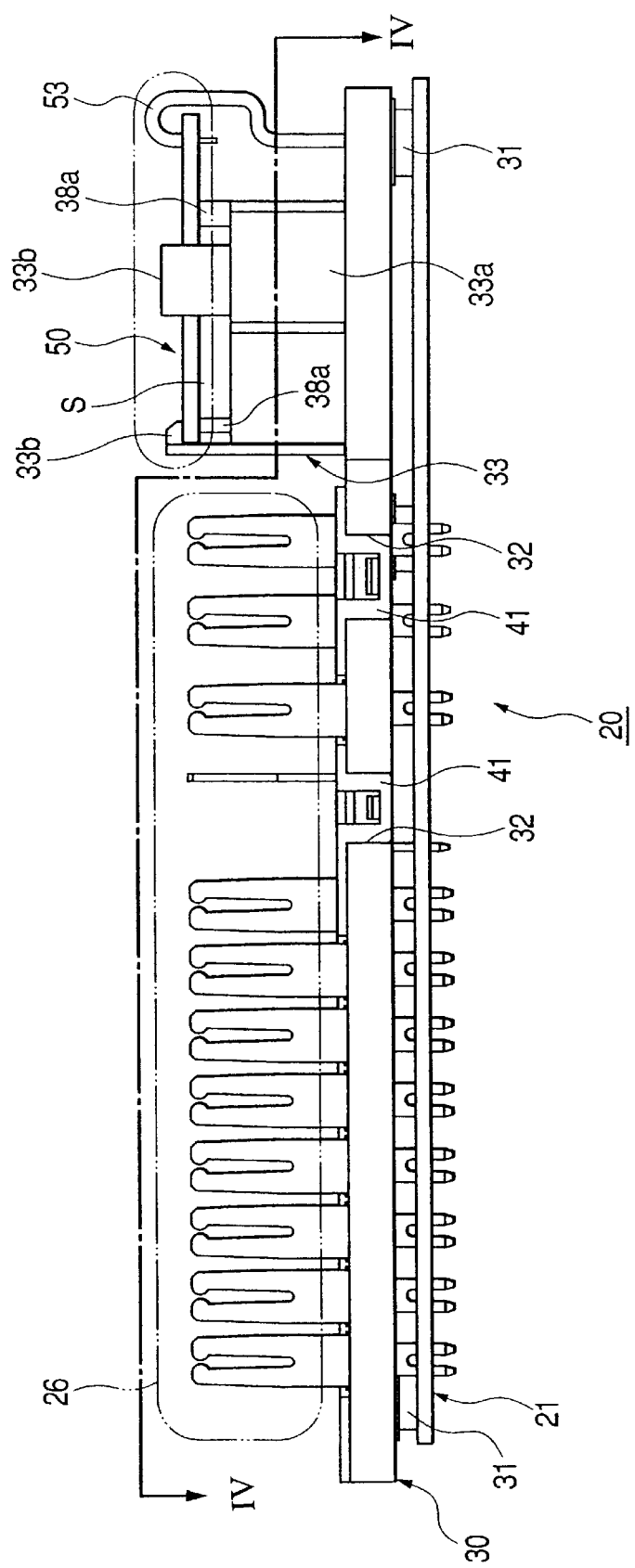
FIG. 5 is a front-elevational view of the electronic control unit.
Figure 6:
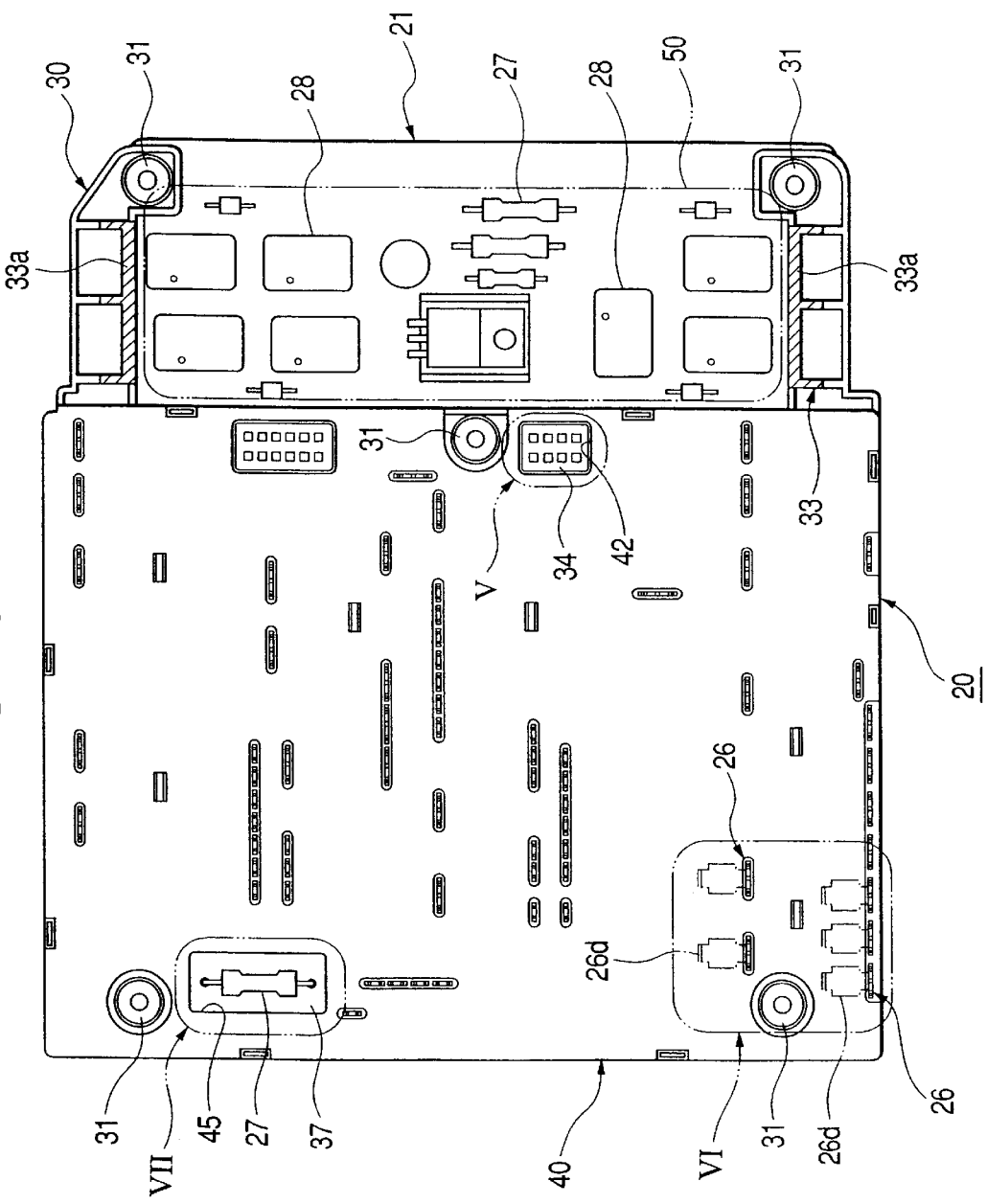
FIG. 6 is a cross-sectional view taken along the line IV—IV of FIG. 5.
Figure 7:
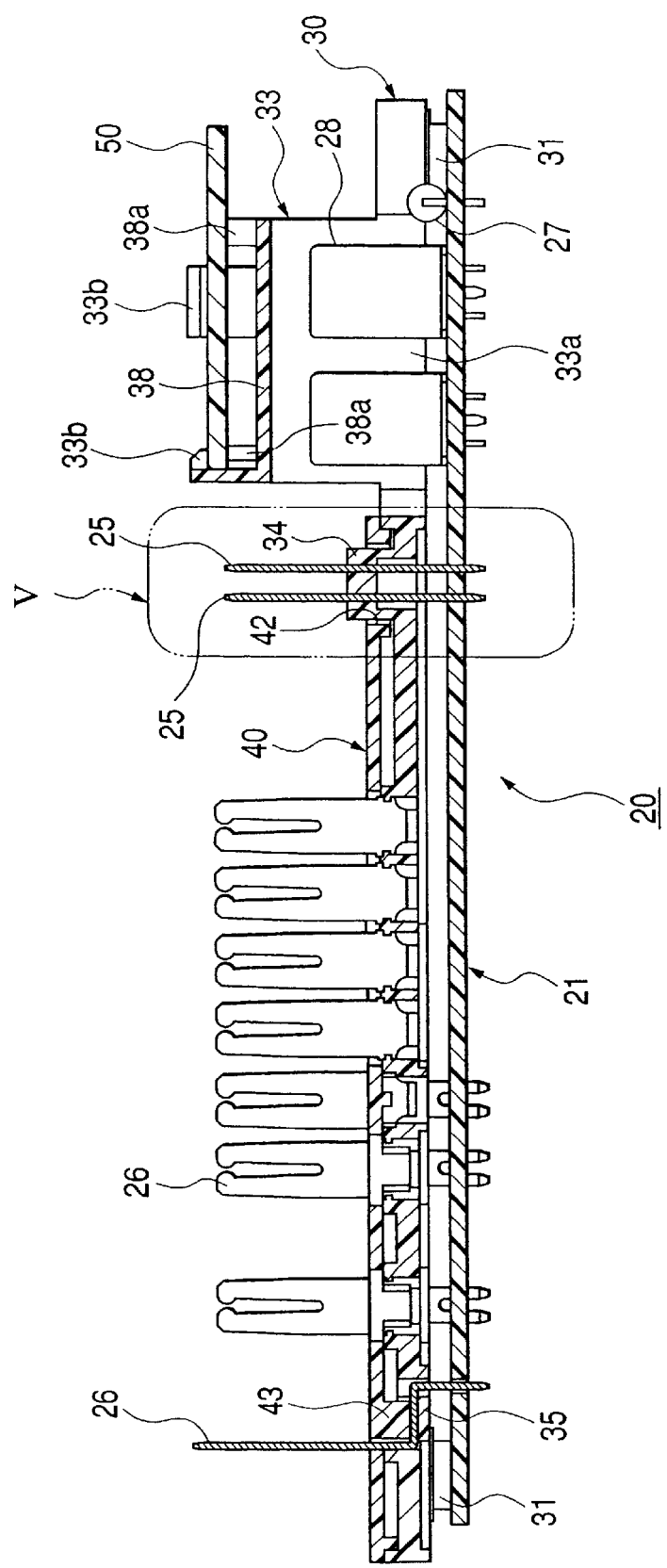
FIG. 7 is a cross-sectional view taken along the line I—I of FIG. 4.
Figure 8:
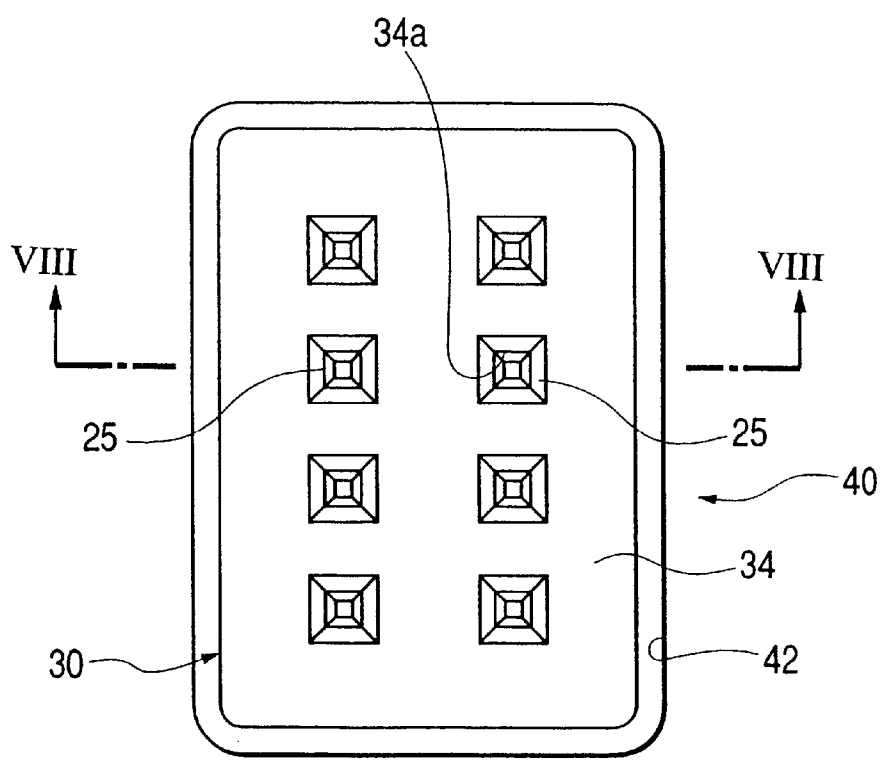
FIG. 8 is an enlarged plan view of a portion V of FIG. 6.
Figure 9:
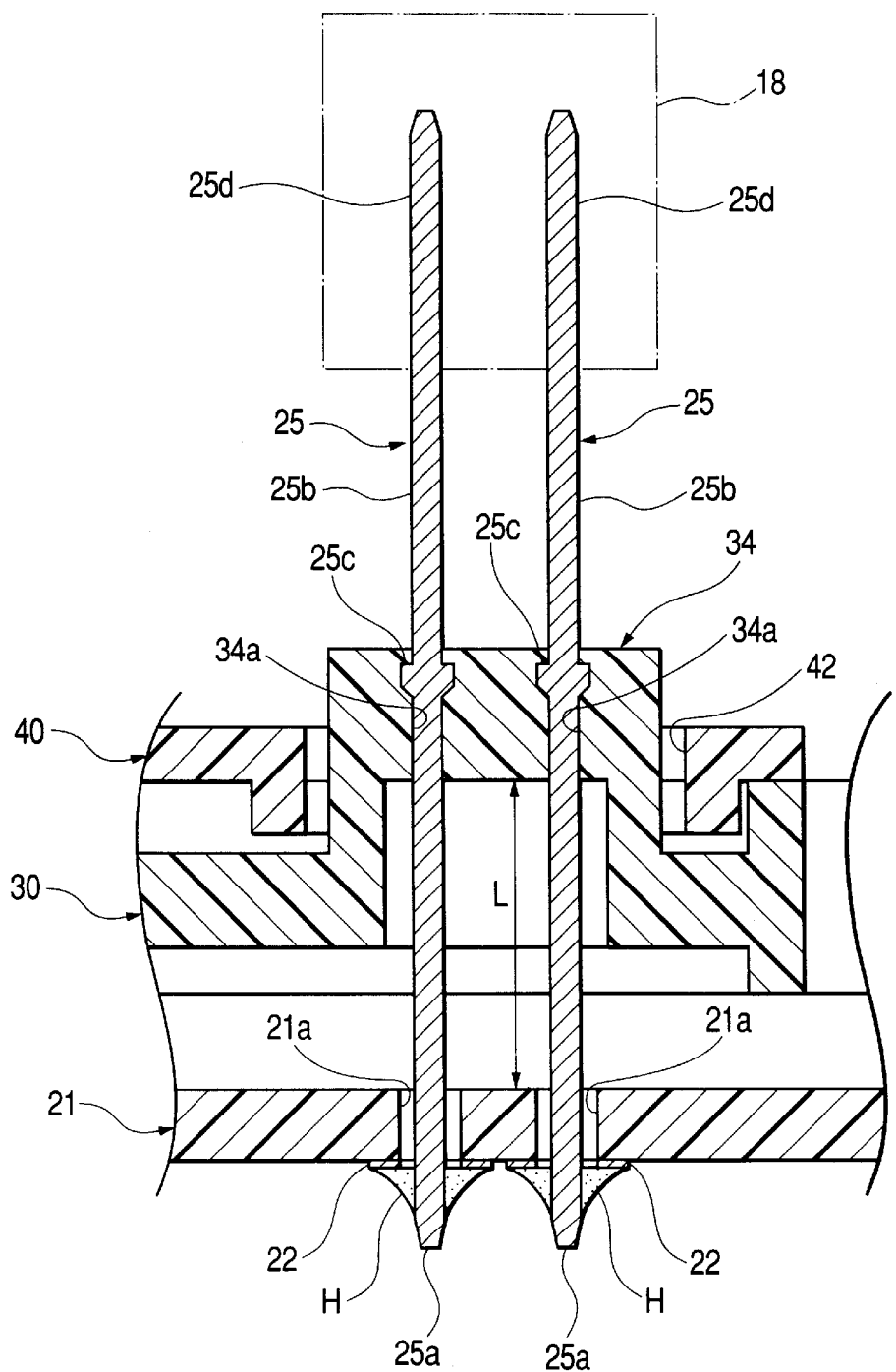
FIG. 9 is cross-sectional view taken along the line VIII—VIII of FIG. 8.
Figure 10:
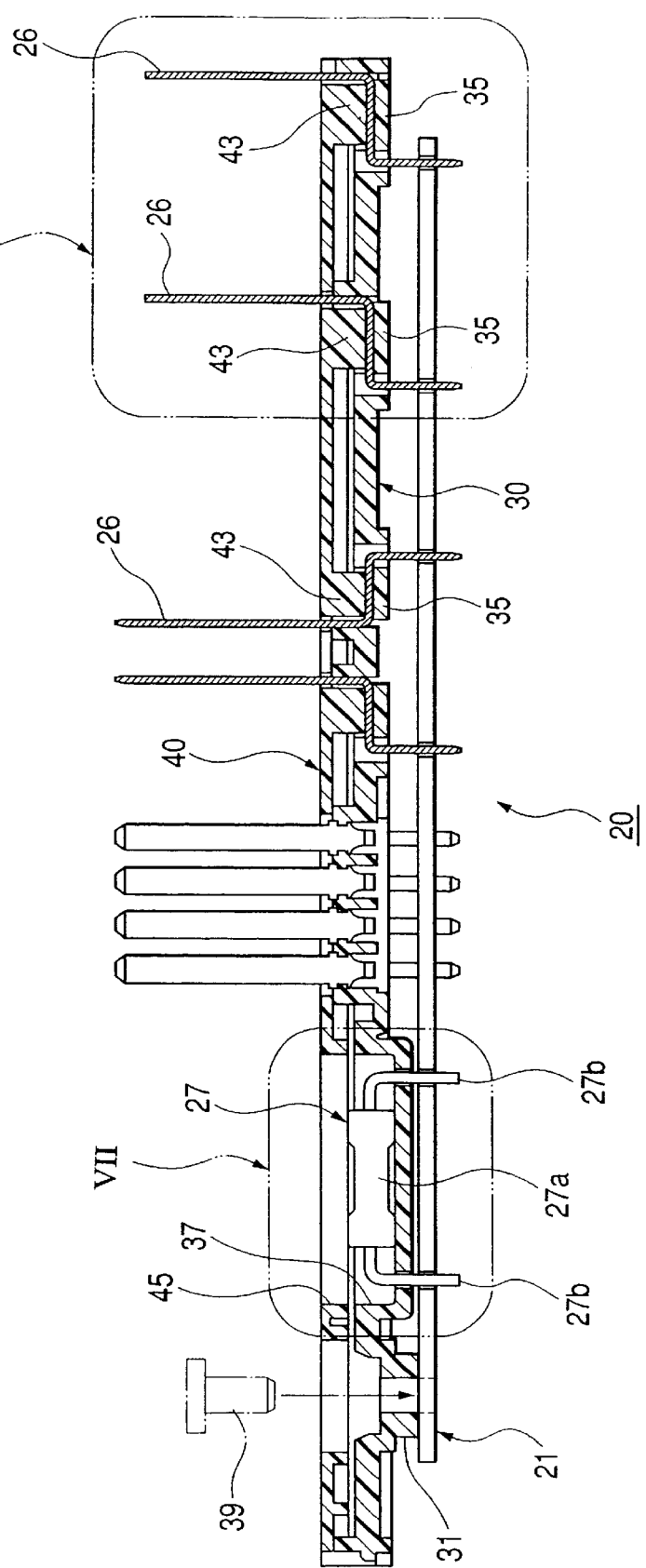
FIG. 10 is a cross-sectional view taken along the line II—II of FIG. 4.
Figure 11:
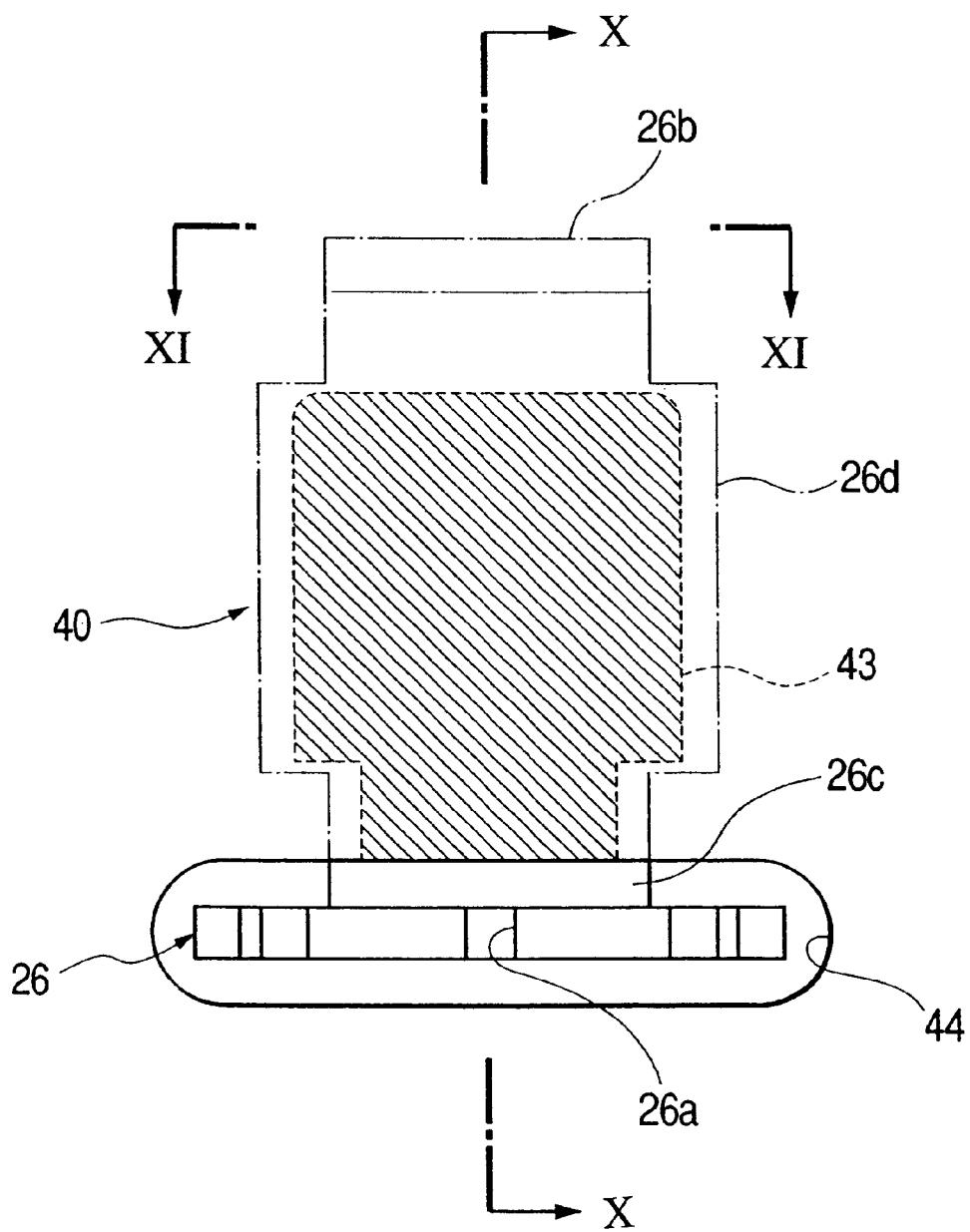
FIG. 11 is an enlarged plan view of a portion VI of FIG. 6.
Figure 12:
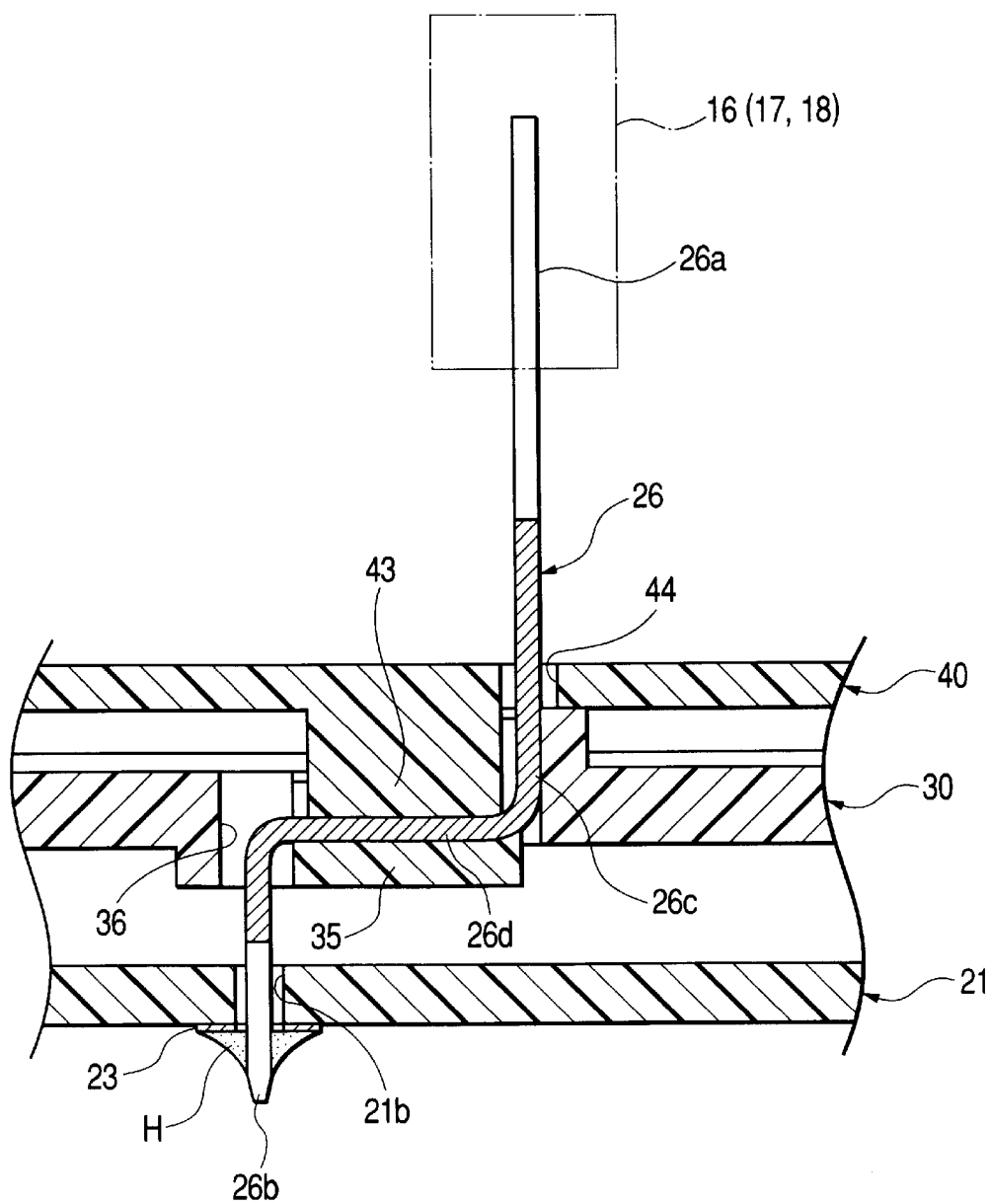
FIG. 12 is a cross-sectional view taken along the line X—X of FIG. 11.
Figure 13:
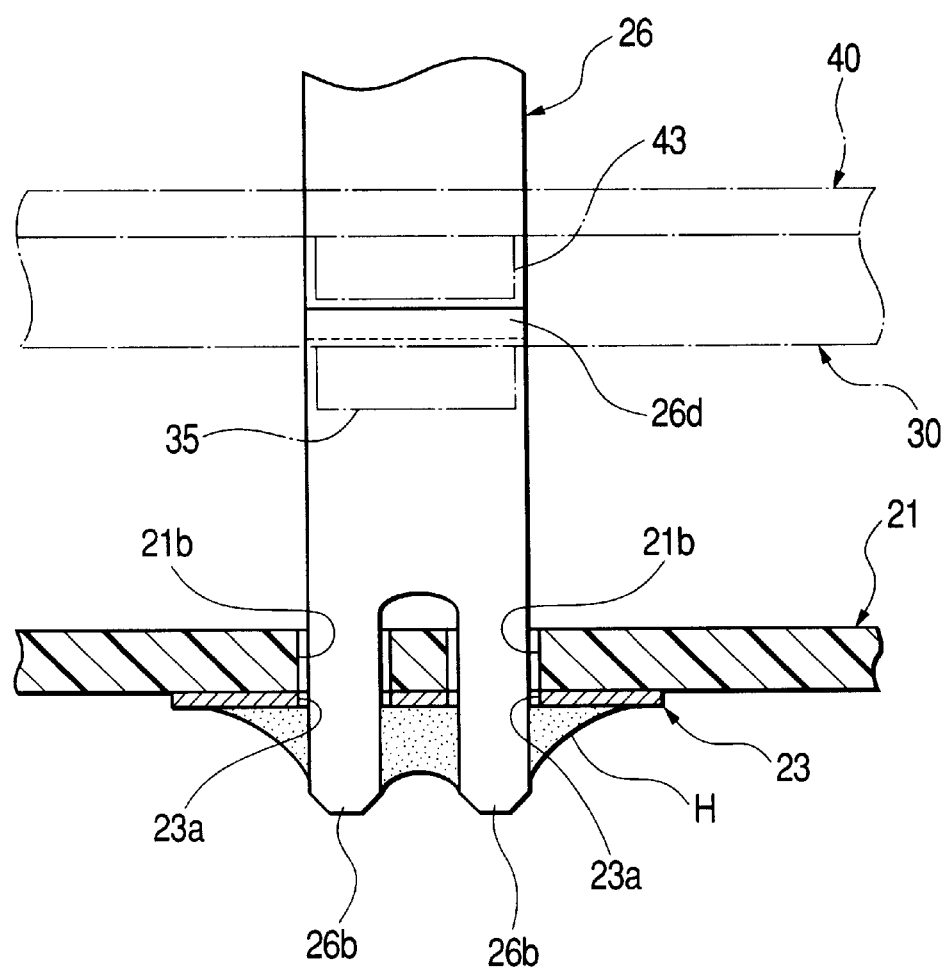
FIG. 13 is a cross-sectional view taken along the line XI—XI of FIG. 11.
Figure 17:
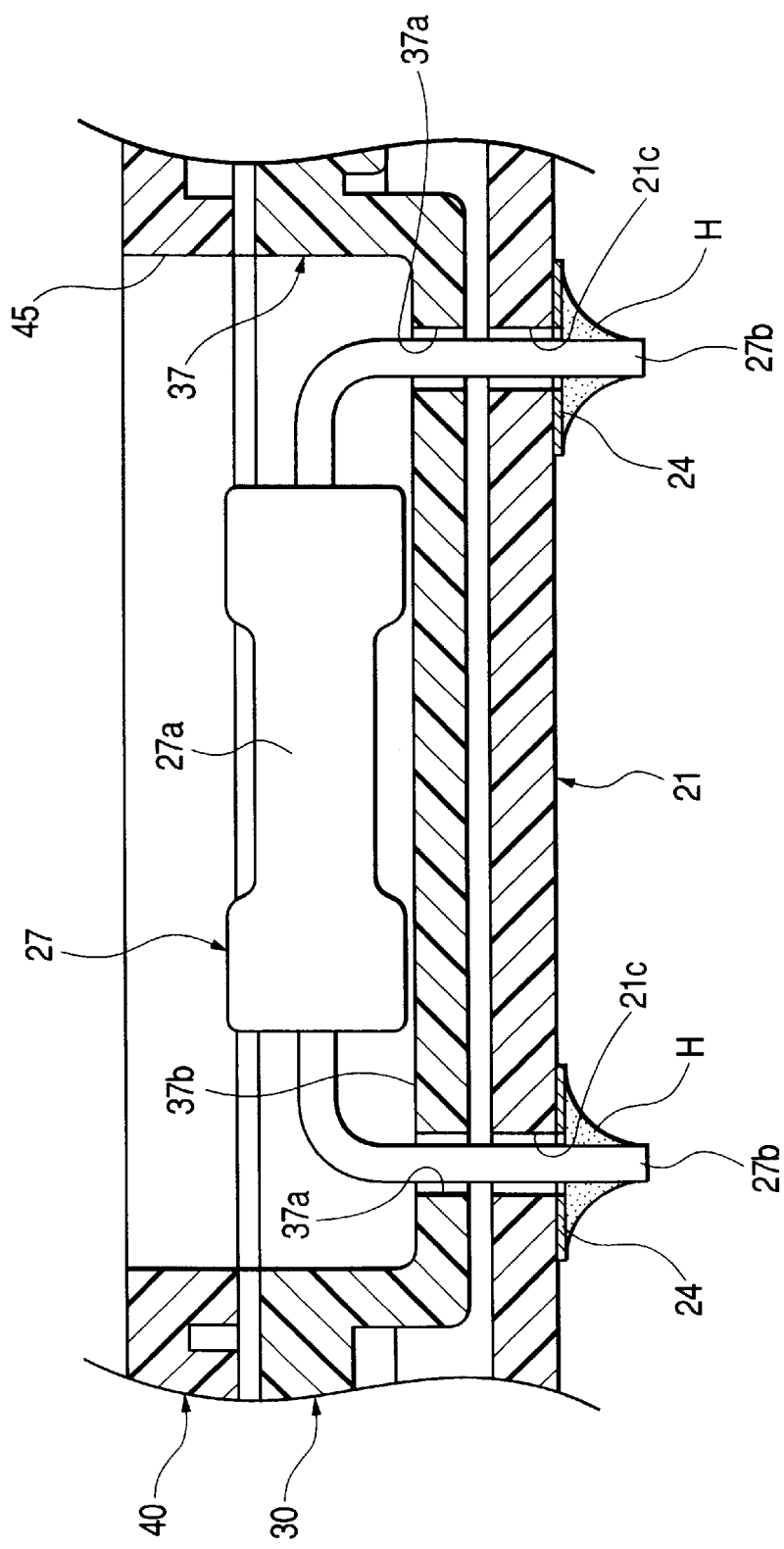
FIG. 17 is a cross-sectional view taken along the line XVI—XVI of FIG. 16.
Figure 18:
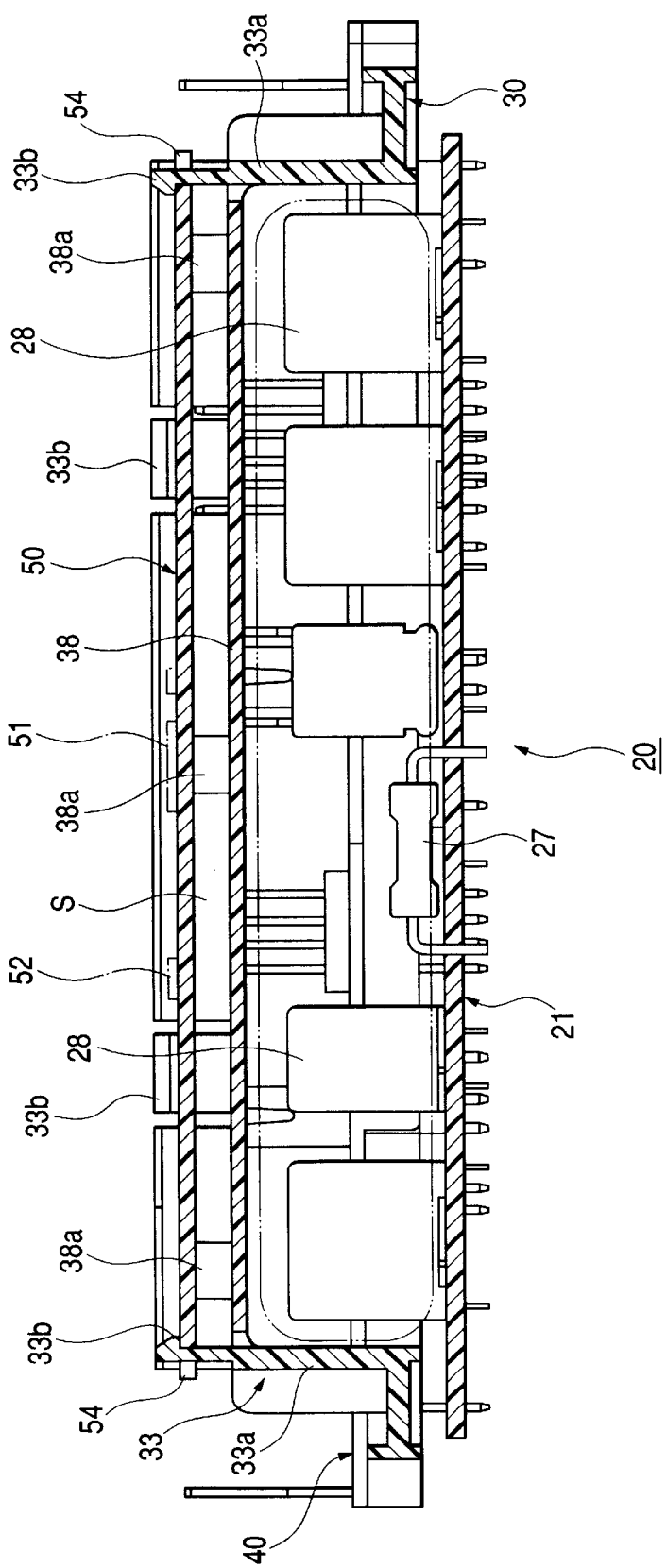
FIG. 18 is a cross-sectional view taken along the line III—III of FIG. 4.
Figure 19:
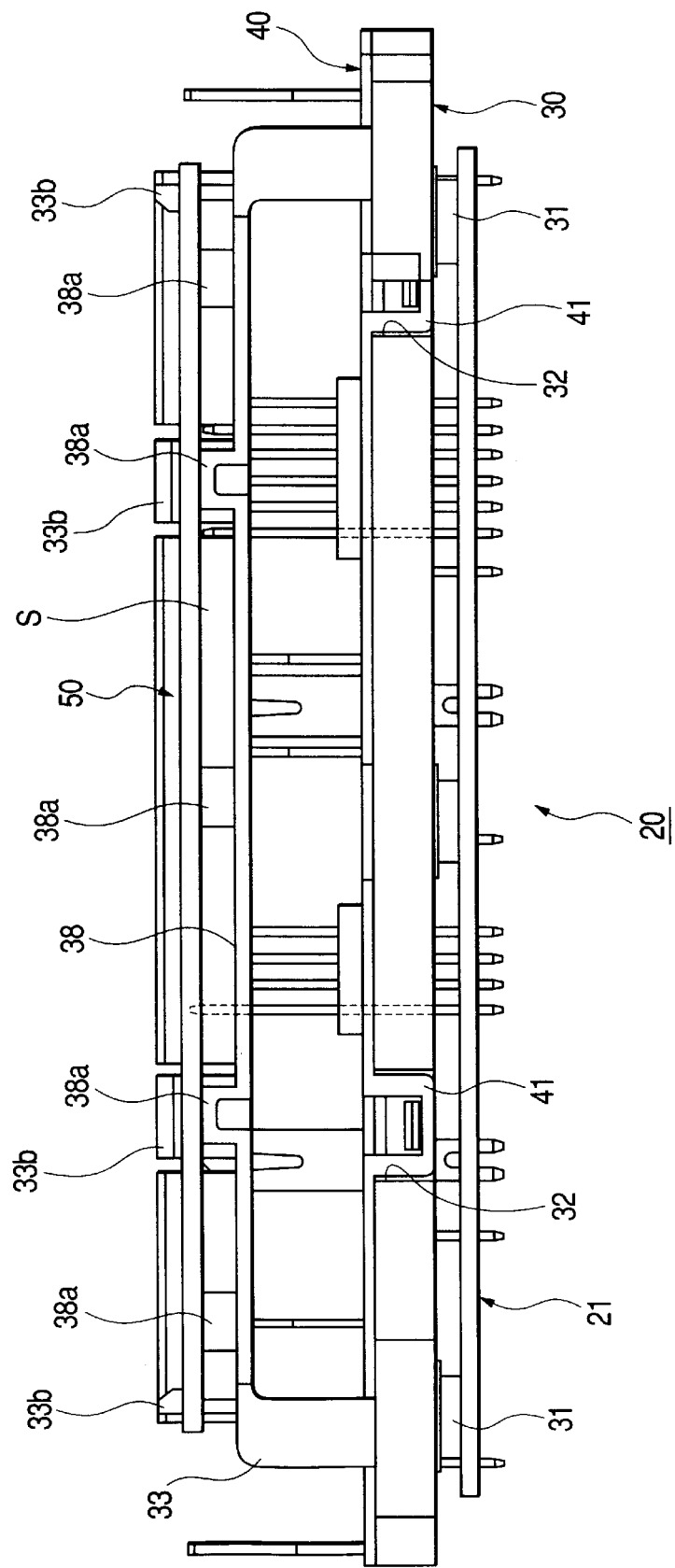
FIG. 19 is a right side-elevational view of the electronic control unit.
Figure 20:
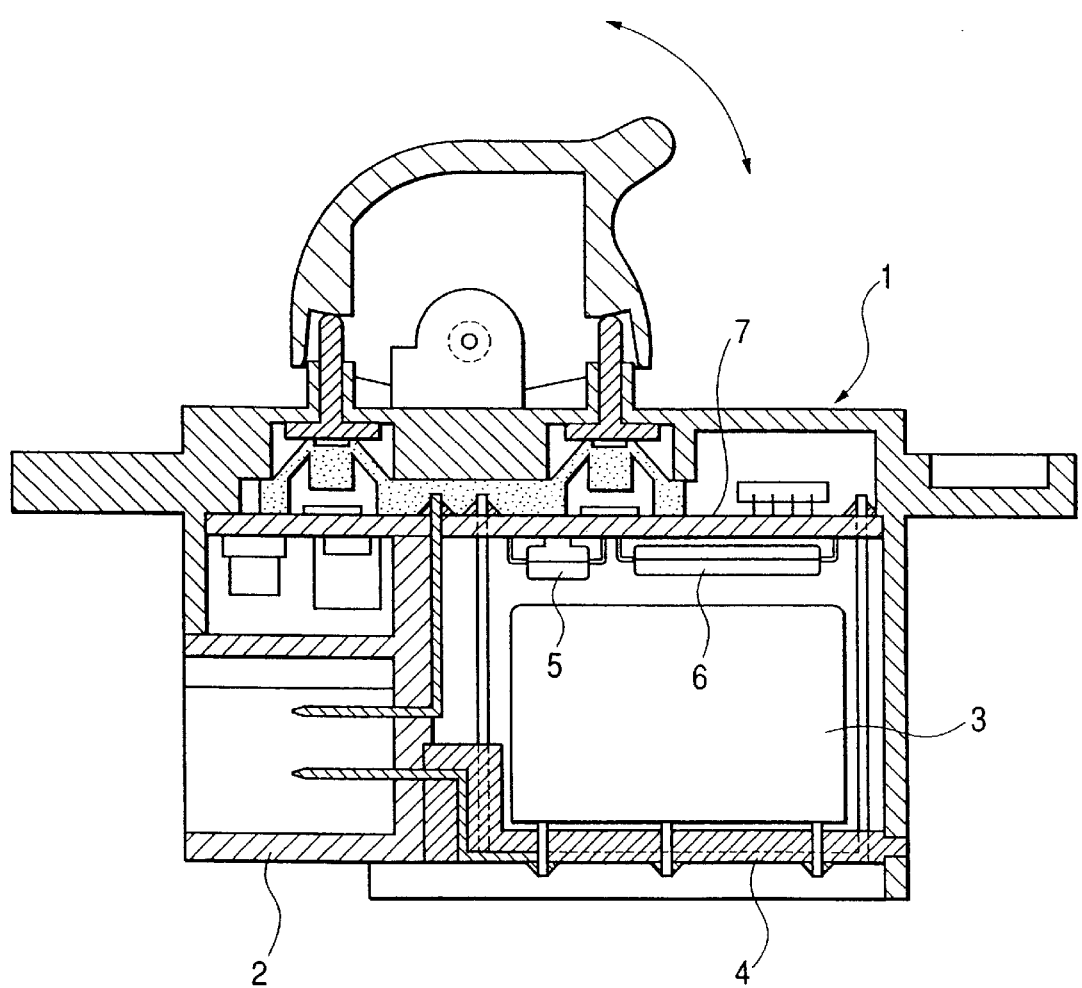
FIG. 20 is a cross-sectional view showing a conventional substrate-stacking structure.

FIG. 1 is an exploded, front-elevational view showing one preferred embodiment of an electronic control unit-integrated electric connection box of the present invention, FIG. 2 is a front-elevational view of the electric connection box, FIG. 3 is a plan view of the electric connection box, FIG. 4 is a plan view of an electronic control unit integrated in the electric connection box, FIG. 5 is a front-elevational view of the electronic control unit, FIG. 6 is a cross-sectional view taken along the line IV—IV of FIG. 5, FIG. 7 is a cross-sectional view taken along the line I—I of FIG. 4, FIG. 8 is an enlarged plan view of a portion V of FIG. 6, FIG. 9 is cross-sectional view taken along the line VIII—VIII of FIG. 8, FIG. 10 is a cross-sectional view taken along the line II—II of FIG. 4, FIG. 11 is an enlarged plan view of a portion VI of FIG. 6, FIG. 12 is a cross-sectional view taken along the line X—X of FIG. 11, FIG. 13 is a cross-sectional view taken along the line XI—XI of FIG. 11, FIG. 14 is a view explanatory of a land portion used in the electronic control unit, FIG. 15 is a perspective view showing the relation between the land portion and terminals, FIG. 16 is an enlarged plan view of a portion VII of FIG. 6, FIG. 17 is a cross-sectional view taken along the line XVI—XVI of FIG. 16, FIG. 18 is a cross-sectional view taken along the line III—III of FIG. 4, and FIG. 19 is a right side-elevational view of the electronic control unit.

As shown in FIGS. 1 to 3, the electronic control unit-integrated electric connection box 10 broadly comprises an upper casing 11 of a box-shape, made of a synthetic resin, a main cover 12 of a box-shape, which is made of a synthetic resin, and can be fitted on this upper casing 11 in a retainable/disengageable manner, a bus bar layer 13, disposed within this main cover 12 at an upper portion thereof, and the electronic control unit (ECU) 20 which is disposed under this bus bar layer 13, and is contained in a space formed by the upper casing 11 and the main cover 12. For example, this electric connection box 10 is used mainly for the purpose of distributing an electric power source of an automobile, and the electronic control unit 20 effects, for example, the on-off control of an engine, lamps, wipers and so on of the automobile.

As shown in FIG. 2, the bus bar layer 13 comprises an insulating substrate 14 on which a plurality of bus bars 15 are mounted, and one end portions of these bus bars are bent upwardly, and define slit blade-like press-connecting portions 15a or the like, respectively. The press-connecting portions 15a of the bus bars 15 extend to respective relay mounting portions 12a and fuse-mounting portions 12b (shown in FIG. 3), formed integrally with and projecting from the upper surface of the main cover 12, and project. Plug-in relays (electronic parts) 16 are adapted to be mounted on the respective relay mounting portions 12a, and fuses (electronic parts) 17 are adapted to be mounted on the respective fuse mounting portions 12b.

As shown in FIGS. 1, 4, 5, 10 and 19, the electronic control unit 20 comprises a main substrate (substrate) 21 (in the form of a rectangular substrate made of a synthetic resin), on which straight terminals 25, crank-shaped terminals 26 and electronic parts, such as resistors 27 and relays 28, are mounted, a terminal plate (heat shielding plate) 30, which has a generally plate-like shape, and is made of a synthetic resin, and is fixedly secured at its lower surface to the main substrate 21 by screws 39 or the like through a plurality of cylindrical bosses 31, and is disposed in opposed relation to the main substrate 21 with a predetermined clearance formed therebetween, a plate-like plate cover 40, which is made of a synthetic resin, and is disposed in overlying, closely spaced, opposed relation to part of the terminal plate 30 (except that region where a frame-shaped holding plate 33 is provided) through a plurality of convex portions 41 (such as hook portions) fitted respectively in a plurality of recesses 32 formed in the terminal plate 30, and a rectangular plate-like control substrate 50 which is held spaced a predetermined distance from the main substrate 21 in stacked relation thereto through the holding plate 33 of the terminal plate 30, and has control parts 51 and 52, such as a microcomputer (CPU), mounted thereon, and is connected to the main substrate 21 through jumper wires 53 and terminals (not shown).

As shown in FIGS. 6 to 9, when the main substrate 21 and the terminal plate 30 are combined together, soldering portions 25a, formed respectively at lower ends of the bar-like, straight terminals 25, are guided respectively into connection holes 21a in the main substrate 21 by the terminal plate 30. More specifically, when the main substrate 21 and the terminal plate 30 are combined together, each connection hole 21a in the main substrate 21 is aligned with a corresponding positioning hole 34a (holding an intermediate portion 25b of the terminal 25) in the terminal plate 30, and the soldering portion 25a of the terminal 25 is guided and inserted into the connection hole 21a in the main substrate 21 disposed in opposed relation to the terminal plate 30a with a predetermined clearance formed therebetween.

The soldering portion 25a of each terminal 25, inserted in the connection hole 21a in the main substrate 21, is soldered and secured to a land portion 22, formed on the lower surface of the main substrate 21, in such a manner that the terminal 25 erects perpendicularly. This soldered portion (solder fillet) is designated by reference character H.

An annular convex portion (retaining portion) 25c is formed integrally on and projects from the outer peripheral surface of the intermediate portion 25b of the terminal 25. The plurality of positioning holes 34a are formed through a central portion of a terminal press-fitting portion 34 of a block-like shape, projecting from the upper surface of the terminal plate 30, and are arranged in two rows. This terminal press-fitting portion 34 projects upwardly beyond an open portion 42 of the plate cover 40, and exposed upper ends 25d of the terminals 25, projecting from the terminal press-fitting portion 34, extend to a connector mounting portion 12c of the main cover 12. An external connector (electrical part) 18 is adapted to be fitted on the upper ends 25d of the terminals 25.

The convex portion 25c of the terminal 25 is press-fitted into the positioning hole 34a in the terminal plate 30, and is retained in a predetermined position in this positioning hole 34a. In this retained condition, this convex portion will not be displaced out of position even upon application of a mechanical stress thereto when attaching and detaching the external connector 18.

As shown in FIGS. 4 and 10 to 13, each of the terminals 26 for a large electric current is formed into a crank-shape or an L-shaped, and is wide as a whole, and its upper end (one end) portion is formed into a slit blade-like press-connecting portion 26a, and the heat-generating part, such as the plug-in relay 16 and the fuse 17, and an external connector 18, can be connected to this press-connecting portion 26a. The lower end (the other end) portion of the terminal 26 is bifurcated to provide a pair of soldering portions 26b and 26b, and these soldering portions 26b and 26b are inserted respectively in connection holes 21b, formed through the main substrate 21, in a perpendicular, upright condition, and are soldered to the land portion 23 formed on the lower surface of the main substrate 21. This soldered portion (solder fillet) is designated by reference character H.

As shown in FIG. 11, an intermediate portion 26c of the terminal 26 is bent to provide a wide flat portion 26d which can be disposed in parallel relation to the main substrate 21, and this flat portion 26d can be held against a terminal holding portion 35 of the terminal plate 30 disposed in opposed relation to the main substrate 21 with the predetermined clearance formed therebetween. Also, the wide flat portion 26d of the terminal 26 can be held against a terminal holding portion 43 of the plate cover 40 of the resin covering the terminal plate 30 with the predetermined clearance formed therebetween. Namely, the wide flat portion 26d of the terminal 26 can be held between the terminal holding portion 35 of the terminal plate 30 and the terminal holding portion 43 of the plate cover 40.

A terminal insertion hole 36 is formed through that portion of the terminal plate 30 disposed in the vicinity of each terminal holding portion 35, and a terminal insertion hole 44 is formed through that portion of the plate cover 40 disposed in the vicinity of each terminal holding portion 43. The exposed press-connecting portion 26a of the terminal 26, projecting from the terminal insertion hole 44 in the plate cover 40, extends to the corresponding relay mounting portion 12a, fuse mounting portion 12b, connector mounting portion 12c or other portion of the main cover 12. As indicated by hatching in FIG. 11, the terminal holding portion 43 of the plate cover 40 is made wide, and has generally the same shape as that of the wide flat portion 26d of the terminal 26. Similarly, the terminal holding portion 35 of the terminal plate 30 is made wide as shown in FIG. 13.

As shown in FIGS. 13 and 15, the lower end portion of the L-shaped (or crank-shaped) terminal 26 is bifurcated to provide the soldering portions (separate narrow portions) 26b and 26b. The pair of connection holes 21b and 21b are formed respectively through those portions of the main substrate 21 opposed respectively to the pair of soldering portions 26b and 26b of each terminal 26. As shown in FIGS. 13 to 15, a pair of terminal insertion holes 23a and 23a of a round shape are formed respectively through those portions of the land portion 23 opposed respectively to the pair of soldering portions 26b and 26b of the terminal 26. A pair of constricted portions 23b and 23b are formed at the outer periphery of the land portion 23, and are disposed between the pair of terminal insertion holes 23a and 23a.

As shown in FIGS. 6, 10, 16 and 17, a concave part housing portion 37 for receiving and holding a resistor (heat-generating part) 27 is formed in a predetermined portion of the terminal plate 30. A pair of insertion holes 37a and 37a are formed through this concave part housing portion 37, and a pair of insertion holes 21c and 21c are formed through the main substrate 21, and a pair of lead portions 27b and 27b, extending from a part body 27a of the resistor 27, can be passed respectively through these holes 37a and 37a and further respectively through these holes 21c and 21c.

The lead portions 27b of the resistor 27 are passed respectively through the insertion holes 37a in the concave part housing portion 37 and further respectively through the insertion holes 21c in the main substrate 21, and the part body 27a of the resistor 27 is held spaced from a bottom surface of the concave part housing portion 37, and in this condition the lead portions 27b are fixedly secured respectively to land portions 24, formed on the lower surface of the main substrate 21, by soldering. These solder portions (solder fillets) are designated by reference character H. An open portion 45, equal in size and shape to the part housing portion 37, is formed in that portion of the plate cover 40 opposed to this part housing portion 37.

As shown in FIGS. 5 to 7, 18 and 19, the main substrate 21, having the heat-generating parts (such as the resistors 27 and the relays 28) mounted thereon, and the control substrate 50, having the control parts 51 and 52 (such as the microcomputer (CPU)) mounted thereon, are held spaced the predetermined distance from each other in stacked relation to each other through the frame-shaped holding plate 33 formed integrally on the right side portion of the terminal plate 30 in a projected manner. Namely, at the ceiling side of the holding plate 33, a heat shielding plate 38 is formed integrally at upper end portions of a pair of side wall portions 33a and 33a of the holding plate 33. An air layer S is formed between the heat shielding plate 38 and the control substrate 50 through a plurality of projections 38a formed integrally on and projecting from an upper surface of the heat shielding plate 38.

The control substrate 50 is positioned through hook portions 33b which are formed integrally with and project from the pair of side wall portions 33a and 33a of the holding plate 33 and the heat shielding plate 38, respectively, and are retainingly engaged respectively in a plurality of recesses 54 in the control substrate 50. In this manner the control substrate 50 is positioned in relative to the main substrate 21. The projections 38a formed on the heat shielding plate 38 abuts with the control substrate 50. The air layer S between the heat shielding plate 38 and the control substrate 50 is always kept to a constant value through the projections 38a.

In the electronic control unit-integrated electric connection box 10 of the above embodiment, the main substrate 21, having the heat-generating parts (such as the resistors 27 and the relays 28) mounted thereon, and the control substrate 50, having the control parts 51 and 52 mounted thereon, are held spaced the predetermined distance from each other through the pair of side wall portions 33a and 33a of the holding plate 33 of the terminal plate 30 made of the synthetic resin, as shown in FIG. 18, and the heat shielding plate 38 is interposed between the two substrates 21 and 50. Therefore, radiation heat from the heat-generating parts 27 and 28 and the main substrate 21 can be positively intercepted, and the influence of this radiation heat on the control parts 51 and 52 and the control substrate 50 can be reduced.

Particularly, the heat shielding plate 38 is formed integrally with and extend between the pair of side wall portions 33a and 33a of the holding plate 33, and the air layer S is formed between the heat shielding plate 38 and the control substrate 50, and therefore the air layer S, always defining a spacing of the constant value, can be positively formed between the heat shielding plate 38 and the control substrate 50 through the pair of side wall portions 33a and 33a of the holding plate 33, and the radiation heat from the heat-generating parts 27 and 28 and the main substrate 21 can be efficiently radiated through the heat shielding plate 38 and the air layer S.

In the above embodiment, although the electronic control unit-integrated electric connection box, containing the electronic control unit, has been described, the above embodiment can, of course, be applied to an electric control unit, separate from an electric connection box, and an electric connection box not containing an electronic control unit.

As described above, in the invention, the substrate, having the heat-generating parts mounted thereon, and the control substrate, having the control parts mounted thereon, are held spaced the predetermined distance from each other through the holding plate, and the heat shielding plate is interposed between the two substrates. Therefore, radiation heat from the heat-generating parts and the substrate can be intercepted by the heat shielding plate, and the influence of this radiation heat on the control parts and the control substrate can be reduced.

In the invention, the heat shielding plate is formed integrally with the holding plate, and the air layer is formed between this heat shielding plate and the control substrate, and therefore the air layer, always defining the spacing of the constant value, can be positively formed between the heat shielding plate and the control substrate through the holding plate, and the radiation heat from the heat-generating parts and the substrate can be efficiently radiated through the heat shielding plate and the air layer.

What is claimed is:

1. A substrate-stacking structure comprising:

a first substrate having a heat-generating part mounted thereon;

a second substrate having a control part mounted thereon; and a heat shielding plate is interposed between said first and second substrates;

wherein said first substrate and said second substrate are held spaced a predetermined distance from each other through a holding plate, and wherein said heat shielding plate is positioned remotely from said first and second substrates such that said heat shielding plate does not make contact with said first and second substrates.

2. A substrate-stacking structure according to claim 1, wherein said heat shielding plate is formed integrally with said holding plate, and an air layer is formed between said heat shielding plate and said second substrate.

3. A substrate-stacking structure according to claim 1, wherein the holding plate includes a side wall portion from which a hook portion is projected and said heat shielding plate is formed integrally with said holding plate, and the hook portion is engaged in a recess formed on the second substrate, so that the second substrate is positioned in relative to the first substrate.

4. A substrate-stacking structure according to claim 2, wherein a projection is formed on the heat shielding plate, and the projection abuts with the second substrate, so that the air layer between the heat shielding plate and the second substrate is always kept to a constant value.

5. A substrate-stacking structure comprising:

a first substrate having a heat-generating part mounted thereon;

a second substrate having a control part mounted thereon; and a heat shielding plate is interposed between said first and second substrates;

wherein said first substrate and said second substrate are held spaced a predetermined distance from each other through a holding plate, and wherein the holding plate includes a side wall portion from which a hook portion is projected and said heat shielding plate is formed integrally with said holding plate, and the hook portion is engaged in a recess formed on the second substrate, so that the second substrate is positioned in relative to the first plate.

6. A substrate-stacking structure according to claim 5, wherein a projection is formed on the heat shielding plate, and the projection abuts with the second substrate, so that the air layer between the heat shielding plate and the second substrate is always kept to a constant value.

* * * * *